(12) United States Patent
Soennichsen (10) Patent No.: US 10,352,807 B2
(45) Date of Patent: Jul. 16, 2019

(54) PRESSURE TRANSDUCER WITH BLUETOOTH COMMUNICATION

(71) Applicant: Veris Industries, LLC, Tualatin, OR (US)

(72) Inventor: Richard Soennichsen, Tualatin, OR (US)

(73) Assignee: Veris Industries, LLC, Tualatin, OR (US)

( * ) Notice: Subject to any disclaimer, the term of this patent is extended or adjusted under 35 U.S.C. 154(b) by 128 days.

(21) Appl. No.: 15/629,838

(22) Filed: Jun. 22, 2017

(65) Prior Publication Data

US 2018/0031436 A1    Feb. 1, 2018

Related U.S. Application Data

(60) Provisional application No. 62/368,832, filed on Jul. 29, 2016.

(51) Int. Cl.

| | |
|---|---|
| *G01L 19/08* | (2006.01) |
| *H04Q 9/02* | (2006.01) |
| *G01L 19/00* | (2006.01) |
| *G08C 17/02* | (2006.01) |

(52) U.S. Cl.
CPC ........ *G01L 19/086* (2013.01); *G01L 19/0061* (2013.01); *G08C 17/02* (2013.01); *H04Q 9/02* (2013.01); *H04Q 2209/43* (2013.01); *H04Q 2209/826* (2013.01); *H04Q 2209/88* (2013.01)

(58) Field of Classification Search
CPC ... G01L 19/086; G01L 19/0061; G08C 17/02; H04Q 9/02; H04Q 2209/88; H04Q 2209/826; H04Q 2209/43
See application file for complete search history.

(56) References Cited

U.S. PATENT DOCUMENTS

| | | |
|---|---|---|
| 3,620,083 A | 11/1971 | Dimeff et al. |
| 4,151,578 A | 4/1979 | Bell |
| 4,158,217 A | 6/1979 | Bell |
| 4,393,714 A | 7/1983 | Schmidt |
| 4,398,194 A | 8/1983 | Johnston |
| 4,598,590 A | 7/1986 | Busch-Vishniac et al. |

(Continued)

OTHER PUBLICATIONS

Pavel et al., Smart Differential Pressure Sensor with Bluetooth Communication Interface, 2008 IEEE, pp. 363-367 (Year: 2008).*

*Primary Examiner* — Toan M Le
(74) *Attorney, Agent, or Firm* — Chernoff, Vilhauer, McClung & Stenzel, LLP (57) ABSTRACT

A sensing unit with an enclosure senses an environmental parameter that includes an environmental sensor to sense the environmental parameter. A processor enclosed within the enclosure receives a sensor signal from the environmental sensor related to the environmental parameter. A wireless communication circuit enclosed within the enclosure receives data from the processor for being transmitted wirelessly related to the environmental parameter. The wireless communication circuit is configured to wirelessly transmit the received data from the processor. The processor and the wireless communication circuit, including the wireless communication circuit wirelessly transmitting the received data, only receives power from a 4-20 ma input signal to the sensing unit from a remote controller.

24 Claims, 10 Drawing Sheets

(56) References Cited

U.S. PATENT DOCUMENTS

| | | |
|---|---|---|
| 4,680,971 A | 7/1987 | Kavli et al. |
| 4,754,365 A | 6/1988 | Kazahaya |
| 8,489,342 B2 | 7/2013 | Dugger et al. |
| 9,481,216 B2 | 11/2016 | Chow et al. |

* cited by examiner

PRESSURE TRANSDUCER WITH BLUETOOTH COMMUNICATION

CROSS-REFERENCE TO RELATED APPLICATIONS

This application claims the benefit of U.S. Provisional App. No. 62/368,832, filed Jul. 29, 2016.

BACKGROUND OF THE INVENTION

The present invention relates to a sensor, and in particular preferably to a low power pressure sensor with Bluetooth capability.

Figure 1:
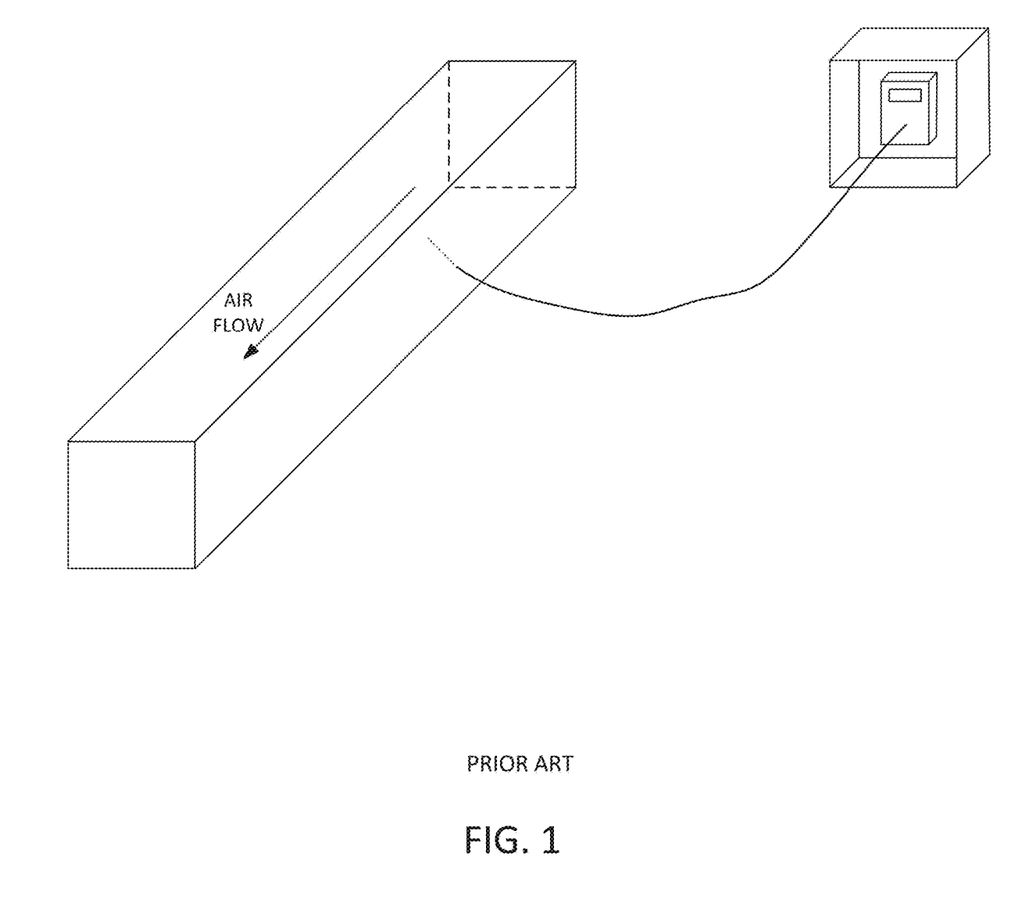
FIG. 1 illustrates a panel installed static pressure sensor.
Figure 2:
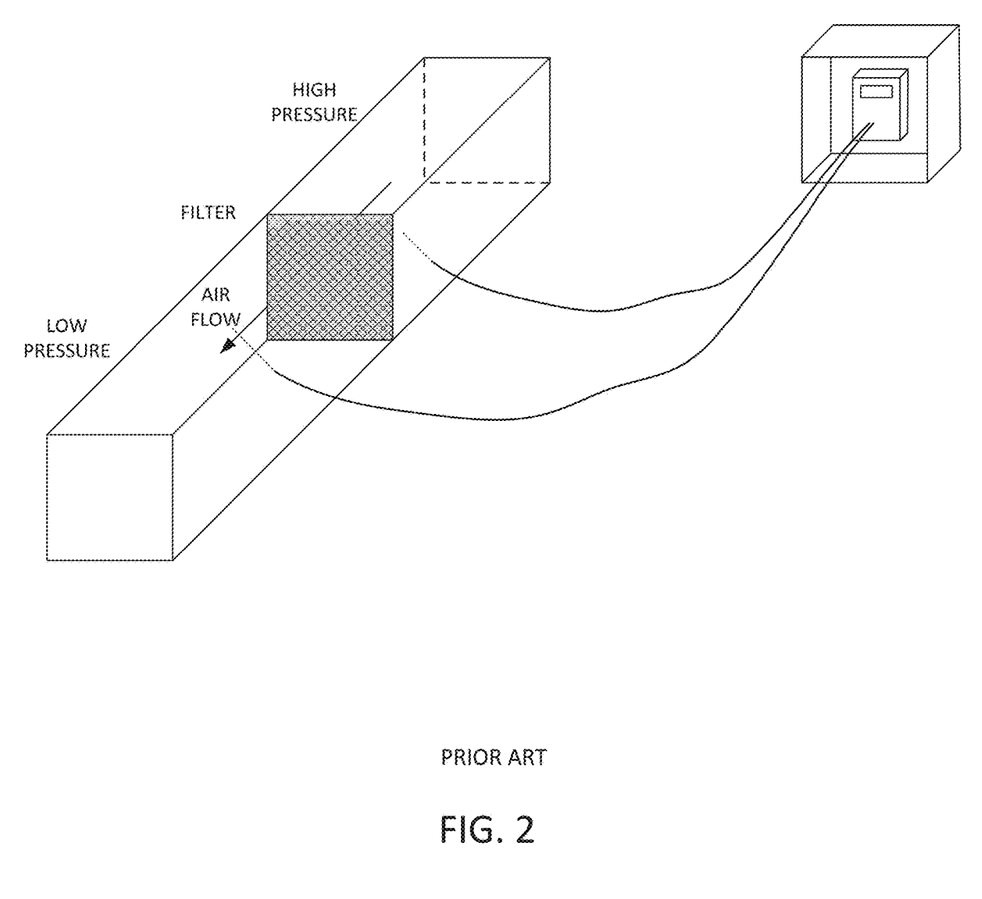
FIG. 2 illustrates a panel installed differential pressure sensor.
Figure 3:
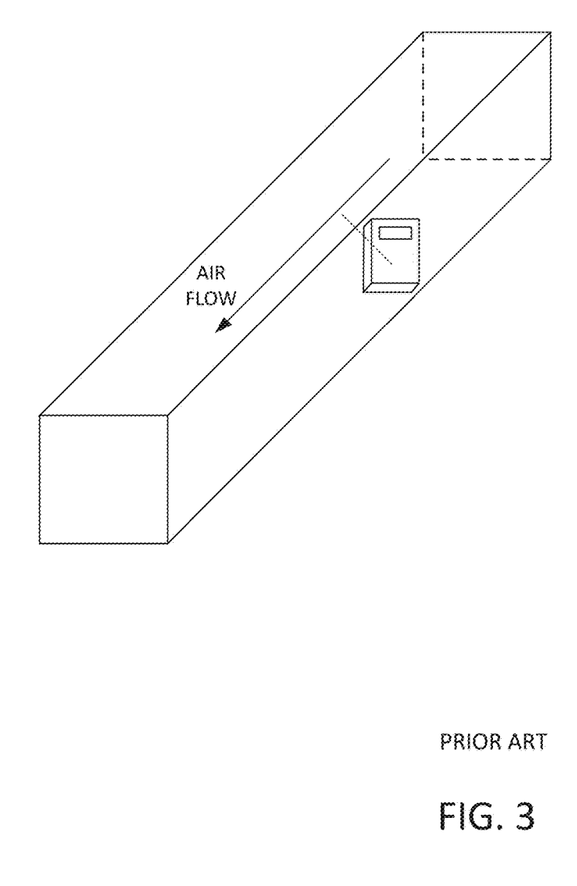
FIG. 3 illustrates a duct installed static pressure sensor.
Figure 4:
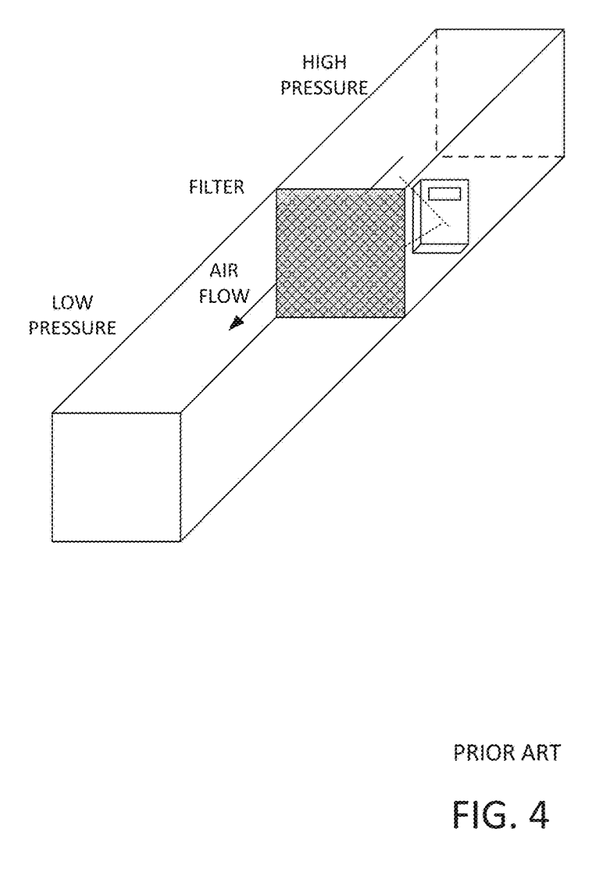
FIG. 4 illustrates a duct installed differential pressure sensor.

Pressure sensors are used for measuring the pressure of fluid (e.g., gas or liquid) often within a pipe, such as a duct. Referring to FIG. 1, in one implementation a pressure sensor is installed in a housing in a panel and a flexible tubular connector is extended into a duct. The pressure as sensed through the flexible tubular connector is measured by a sensor included within the housing to determine a static pressure. Referring to FIG. 2, in another implementation a pressure sensor is installed in a housing in a panel and a pair of flexible tubular connectors is extended into a duct. The pressure as sensed through the pair of flexible tubular connectors is measured by a sensor included within the housing to determine a static and/or differential pressure. Referring to FIG. 3, in another implementation a pressure sensor may be installed on the exterior surface of a duct and through a sensor member extending into the duct the static pressure is sensed through the sensor member by a sensor included within the housing. Referring to FIG. 4, in another implementation a pressure sensor may be installed on the exterior surface of a duct and through a sensor member extending into the duct, the static and/or differential pressure as sensed through a pair of tubular connectors is sensed through the sensor member by a sensor included within the housing.

Figure 5:
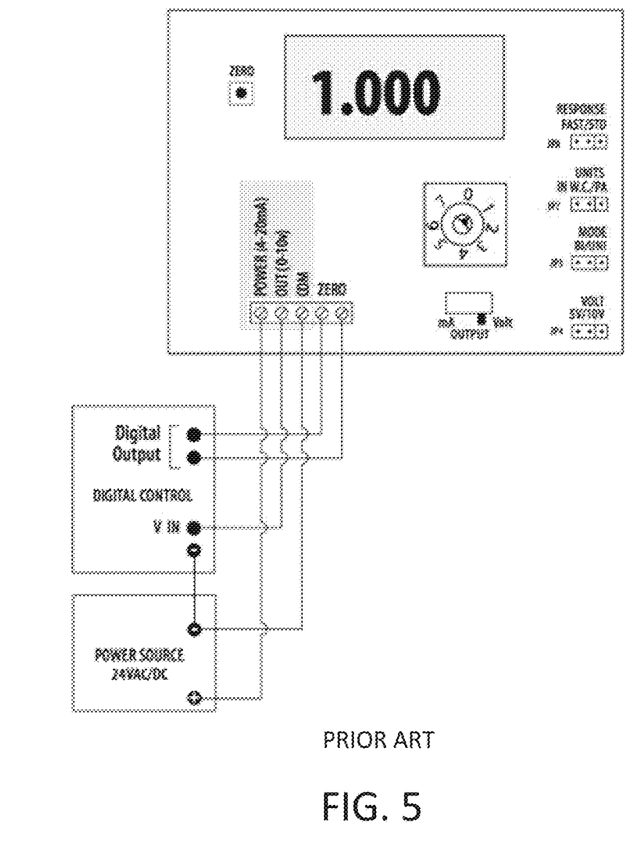
FIG. 5 illustrates a display for a pressure sensor.

Referring to FIG. 5, the pressure sensor may include a display attached to the housing for displaying the current pressure and/or differential pressure being sensed. In many cases, a 4-20 ma loop circuit is used to provide power to the pressure sensor for its electronics included therein, and to provide an analog output signal indicating the pressure levels to a remote sensing device. The pressure sensor may also include a digital input and a digital output, if desired. For example, a 4 ma output signal may indicate a relatively low pressure while a 20 ma output signal may indicate a relatively high pressure.

Figure 6:
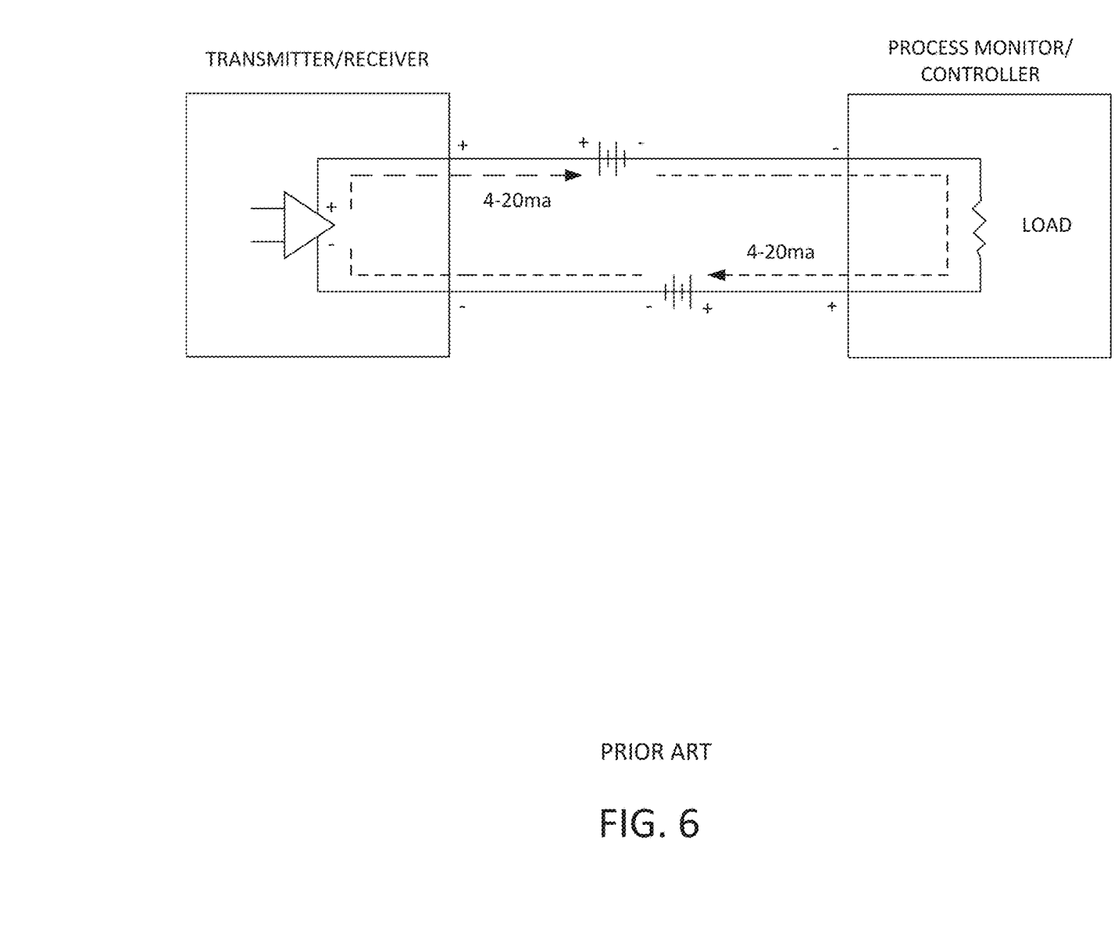
FIG. 6 illustrates a transmitter and a process monitor/controller.

Referring to FIG. 6, the pressure sensor may include a transmitter/receiver that provides the 4-20 ma analog output signal to a process monitor/controller which receives the 4-20 ma output signal. Similarly, the process monitor/controller may include a transmitter/receiver that provides the 4-20 ma analog output signal to the pressure sensor which receives the 4-20 ma output signal.

Figure 7:
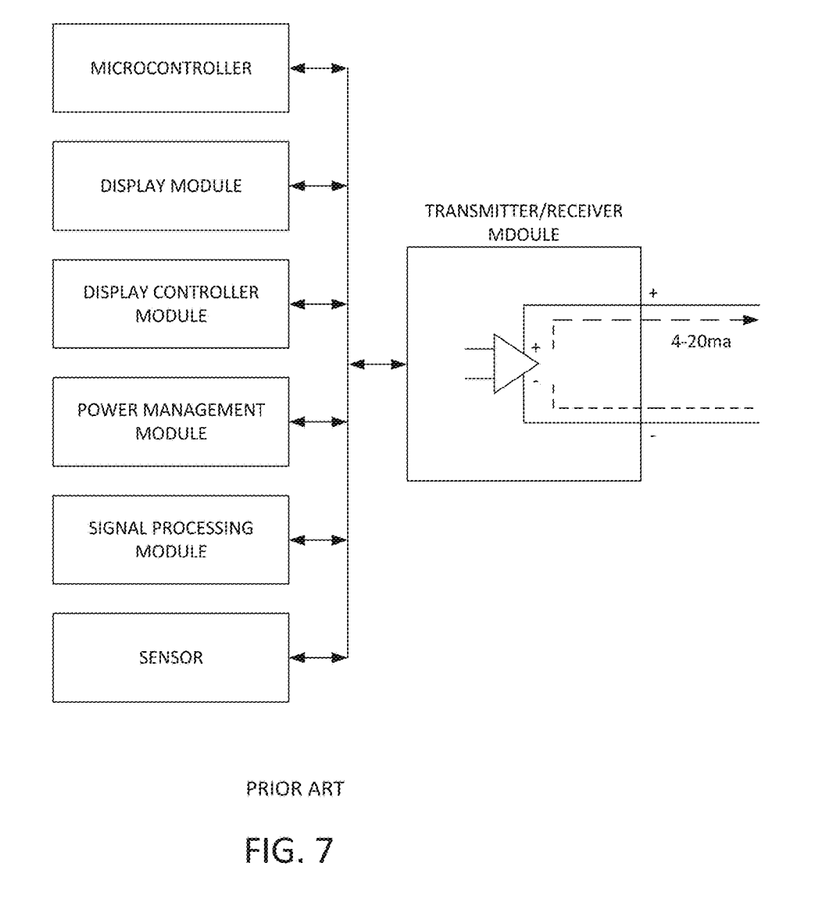
FIG. 7 illustrates a pressure sensor and exemplary components thereof.

Referring also to FIG. 7, the power provided to the pressure sensor using the 4-20 ma loop circuit may be used to provide suitable power for the sensor electronics included within the pressure sensor. The sensor electronics may include, for example, a microcontroller, a display controller module, a display module, a sensor, a power management module, a signal processing module, and a transmitter/receiver module to provide a suitable 4-20 ma analog output signal. As it may be observed, with relatively low voltage levels used for the 4-20 ma loop signal there is limited power available for additional electronics within the pressure sensor, while maintaining the ability to provide a suitable 4-20 ma output signal to the process monitor/controller.

What is desired, therefore, is a pressure sensor that includes additional electronics therein, while still maintaining the use of a 4-20 ma loop signal as the power source.

The foregoing and other objectives, features, and advantages of the invention may be more readily understood upon consideration of the following detailed description of the invention, taken in conjunction with the accompanying drawings.

DETAILED DESCRIPTION OF PREFERRED EMBODIMENT

Figure 8:
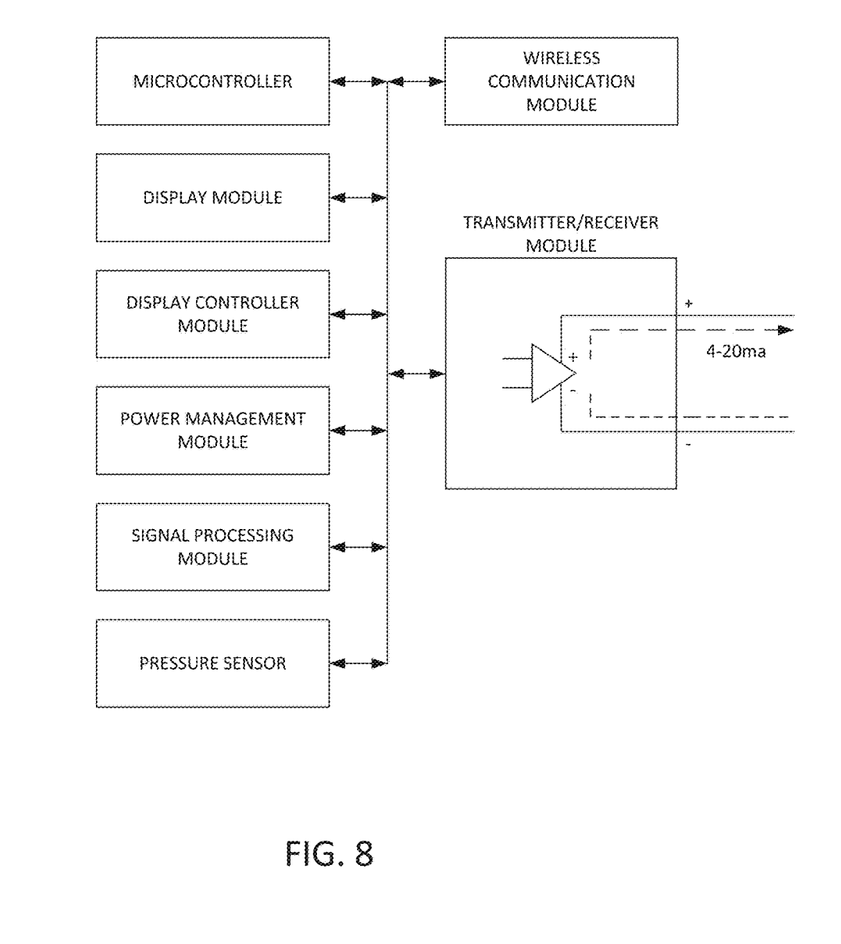
FIG. 8 illustrates a pressure sensor and a wireless communication module.

Referring to FIG. 8, a modified pressure sensor may include a wireless communication module, and in particular preferably includes a wireless Bluetooth communication module. Preferably, the Bluetooth communication module is compliant with the Bluetooth lower energy protocol, generally referred to as Bluetooth Smart or Version 4.0+ of the Bluetooth specification. The wireless communication module may wirelessly send and/or receive data. It is to be understood that other types of wireless communications may be included, as desired. Unfortunately, the wireless communication modules and in particular a Bluetooth wireless communication module, tends to require approximately 10-15 ma of current to properly operate. However, the existing electronics of the pressure sensor also require a sufficient amount of current to properly operate, which is typically designed to be approximately 2-3 ma. As it may be observed, with a total of 4-20 ma of available current having a suitable voltage level from the loop circuit to the pressure sensor, there may be insufficient available current having a suitable voltage level, to provide a full range of 4-20 ma for the output with a pressure sensor incorporating both the typical electronics therein and a wireless communication module, such as a Bluetooth communication module.

Figure 9:
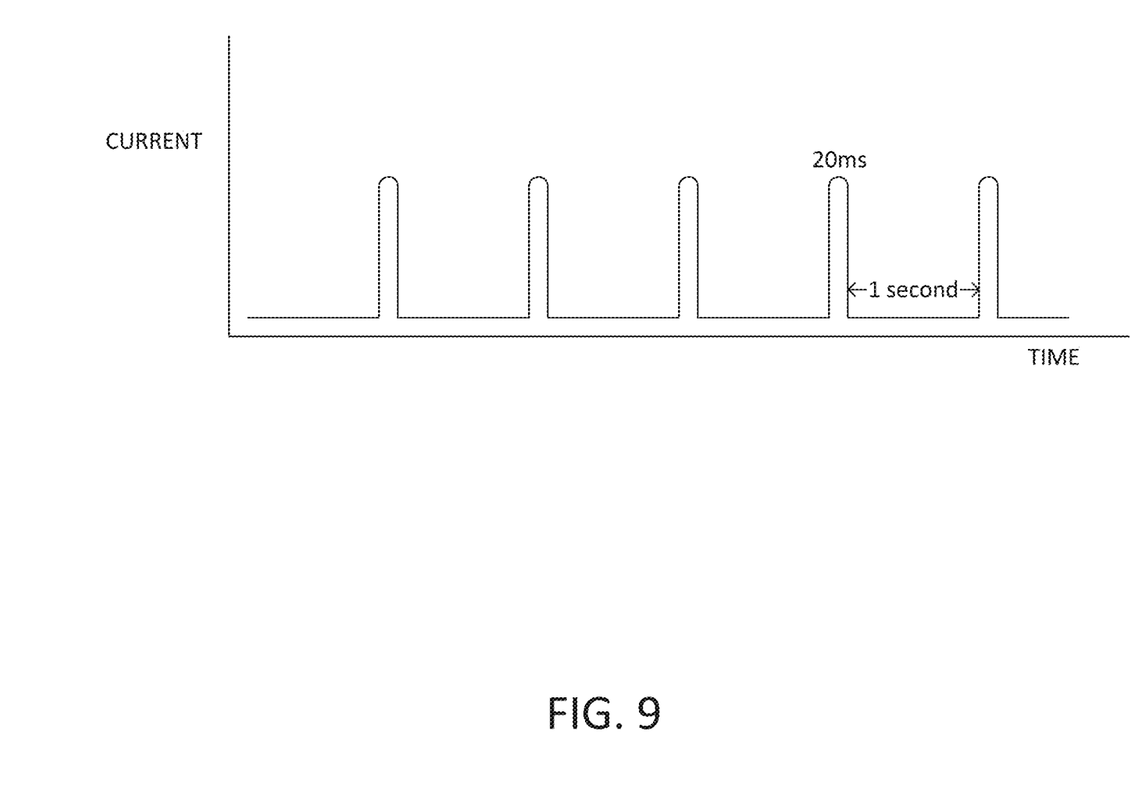
FIG. 9 illustrates a transmission of energy using a pulse width modulated pulse train.

Referring to FIG. 9, while the current drawn by a Bluetooth wireless communication module tends to be on the order of 15 ma, if the amount of data transmitted during any particular time period is maintained relatively low then the power used over the overall particular time period may be maintained relatively low. For example, the current used for a transmission may be on the order of 15 ma for a duration of 20 milliseconds for each burst of data at a frequency of 1 burst per second. Between each burst of data the power drawn by the Bluetooth communication module tends to be negligible. The duration of the interval between the bursts may be modified, as desired. The typical electronics of the pressure sensor may be coupled to a wireless communication module, such as the Bluetooth communication module, to transmit and/or receive data where the transmission and/or reception of data is provided in such a manner that the capability of providing a suitable 4-20 ma loop current is maintained.

Figure 10:
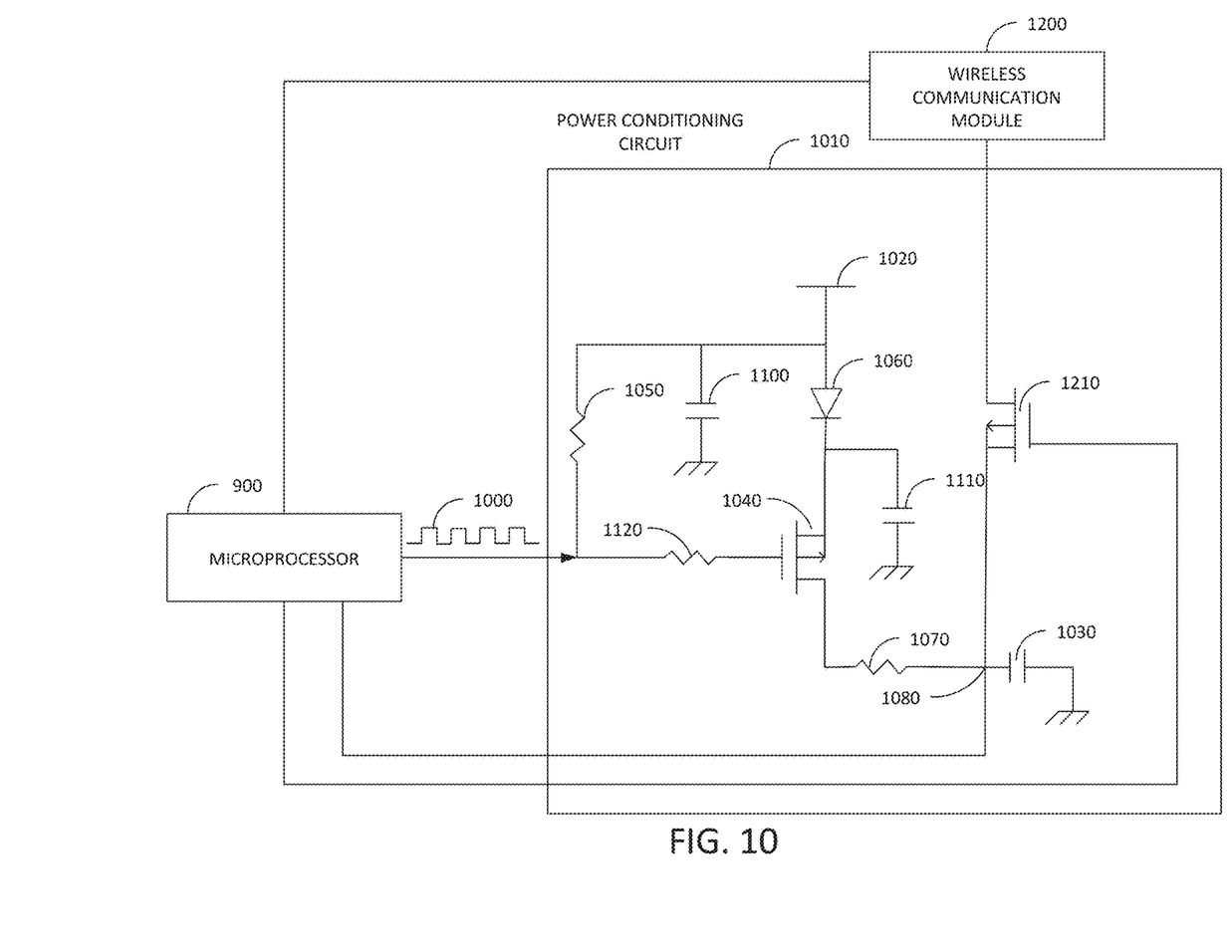
FIG. 10 illustrates an energy harvesting circuit for wireless communication.

Referring to FIG. 10, an output of a microprocessor 900 may include an input signal 1000, such as a voltage modulated signal, that is provided to a power conditioning circuit 1010 for a Bluetooth wireless communication module. The input signal 1000, in general may change its duty cycle (e.g., when the signal is high and when the signal is low) at any time, as desired. The power conditioning circuit 1010 may include power provided by the 4-20 ma current loop, such as 3.3 voltage power 1020. The voltage power 1020 may be used to charge a charge storage device 1030, such as a capacitor. The capacitor is preferably a "super-capacitor" on the order of a 1 farad capability. In this manner, the capacitor has a behavior akin to a battery.

A switch 1040, preferably in the form of a field effect transistor, may be controlled by the input signal 1000. When the input signal 1000 is low then the switch 1040 is turned on and the power from the voltage power 1020 is interconnected to the charge storage device 1030 to charge the capacitor. When the input signal 1000 is high then the switch 1040 is turned off and the power from the voltage power 1020 is not interconnected to the charge storage device 1030 so that the capacitor is not further charged. In this manner, as a result of the level of the input signal 1000, power may be selectively stored by the charge storage device, at least until the charge storage device has maximum energy stored. The input signal 1000 may be interconnected to the voltage power 1020 by a pull up resistor 1050 to ensure that when the input signal 1000 is not powered, then the switch 1040 is turned off so that the capacitor is not inadvertently further charged.

A diode 1060 may be included to inhibit the charge storage device 1030 from providing power to the voltage power 1020, and thus the other electronics of the pressure sensor. A current limiting resistor 1070 may be included to define a charge current range for a given range of pulse width modulation duty cycle range at a feedback voltage node 1080 that may provide feedback to the microprocessor 900 of the present voltage level of the charge storage device 1030. A pull down capacitor 1100 may be included to smooth out the voltage transitions between the input signal 1000 and the voltage power 1020. A ringing capacitor 1110 may be included to reduce the ringing that results primarily as a result of the pulse width modulation input signal and the diode. A ringing resistor 1120 may be included to reduce the ringing that results primarily as a result of the pulse width modulation and the switch 1040. By way of example, the pull up resistor 1050 may be 100K ohms, the voltage setting resistor 1070 may be 75 ohms, and the ringing resistor 1120 may be 100 ohms.

It may be observed that as the voltage increases on the charge storage device 1030, the voltage drop across the voltage setting resistor 1070 decreases and therefore the current drawn from the voltage power 1020 decreases. With this decreases in the current as a result of the change in the charge stored by the charge storage device 1030, it is desirable to adjust the duty cycle of the input signal 1000 to provide a more consistent current to the charge storage device 1030. With the circuit topology illustrated in FIG. 10, when the voltage on the charge storage device 1030 reaches approximately 2.5, no more charge may be provided to the charge storage device 1030 until part of the charge is used thus lowering the voltage on the charge storage device 1030. The feedback voltage node 1080 provides an input to the microprocessor 900 of the voltage level storage by the charge storage device 1030. Based upon the voltage sensed by the feedback voltage node 1080 the microprocessor 900 may adjust the pulse width modulated input signal 1000 to modify the amount of additional charge provided to the charge storage device 1030. As a result, the microprocessor 900 may manage the energy budget being provided to the charge storage device 1030 so that the remaining electronics of the pressure sensor may have sufficient power and also there is sufficient power to provide a suitable 4-20 ma output signal from the pressure sensor.

The energy from the charge storage device 1030 may be provided to the wireless communication module 1200. The wireless communication module 1200 preferably receives and/or transmits data as periodic bursts so that the energy storage by the charge storage device 1030 may be maintained above a preferred level so that sufficient energy is available for the wireless communication module 1200. When the pressure sensor is initialized, the voltage levels provided to the wireless communication module 1200 is considerably lower than the specified minimum suitable for proper operation of the wireless communication module. For example, with a sufficiently low voltage level being provided to the wireless communication module 1200, it may draw more current than during normal operation, with current levels being drawn sufficient to not leave sufficient remaining current for the 4-20 ma output at a suitable voltage level. To overcome this undesirable low voltage level operation, a switch 1210 may be included, such as a field effect transistor. The switch 1210 may be interconnected to the microprocessor 900 so that the microprocessor may disconnect the wireless communication module 1200 from the charge storage device 1030 until the charge on the charge storage device 1030 reaches a sufficiently large value or a sufficient duration has occur such that the charge on the charge storage device 1030 has likely reached a sufficient level.

In operation the Bluetooth wireless communication module may generally take 1-2 minutes to drain the charge storage device from approximately 2.5 volts to approximately 2.4 volts. This drain may be the result of the low on-going energy draw combined with 1-3 data bursts per second. After reaching approximately 2.4 volts, the microprocessor may add charge to the charge storage device to bring the voltage back up to approximately 2.5 volts.

In operation it may be desirable to include a startup mode where substantially all the available energy not being used for the other electronics is provided to the charge storage device so that the charge storage device is charged considerably faster than would occur if a reserve of energy was reserved sufficient to provide a suitable 4-20 ma current output at a sufficient voltage level. By way of example, using this technique the charge storage device may be fully charged in approximately 1-2 minutes while using a full 20 ma of the available current. It is noted that while in this state the loop current is an invalid indicator of the sensor output. After the initial charging of the charge storage device, then the power conditioning circuit may be used to provide additional charge to the charge storage device while also providing wireless communications. It is noted that while in this state the loop current is a valid indicator of the sensor output.

It is to be understood, that the power conditioning circuit may be used for other sensor based technologies or any other 4-20 ma loop powered device, as desired. The sensor may be included within a housing or exterior to the housing with a signal from the sensor being provided to electronics included within the housing. In another embodiment, the microprocessor may be integrated together with the wireless communication module.

By way of example, for Bluetooth the transmission may include 4 bytes for configuration and between 250-750 bytes at 500 Kbits/second. Preferably, the average current draw by the wireless communication module is approximately 0.7 ma, which is below the threshold available so that the charge storage device always has sufficient charge for the wireless communication module.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A sensing unit to sense an environmental parameter comprising:
   (a) said sensing unit including an environmental sensor to sense said environmental parameter;
   (b) said sensing unit including an enclosure;
   (c) a processor enclosed within said enclosure that receives a sensor signal from said environmental sensor related to said environmental parameter;
   (d) a wireless communication circuit enclosed within said enclosure that receives data from said processor for being transmitted wirelessly related to said environmental parameter;
   (e) said wireless communication circuit configured to wirelessly transmit said received data from said processor;
   (f) said processor and said wireless communication circuit, including said wireless communication circuit said wirelessly transmitting said received data, only receive power from a 4-20 ma input signal to said sensing unit from a remote controller.

2. The sensing unit of claim 1 wherein said wireless communication circuit is a Bluetooth communication circuit.

3. The sensing unit of claim 1 wherein said sensing unit provides a 4-20 ma output signal to said remote controller.

4. The sensing unit of claim 1 wherein said processor provides a voltage modulated signal to a power conditioning circuit.

5. The sensing unit of claim 4 wherein said wireless communication circuit receives its operational power from said power conditioning circuit.

6. The sensing unit of claim 5 wherein said processor varies a duty cycle of said voltage modulated signal.

7. The sensing unit of claim 6 wherein said power conditioning circuit only receives power from said 4-20 ma input signal to said sensing unit from said remote controller.

8. The sensing unit of claim 7 wherein said power conditioning circuit includes an energy storage device.

9. The sensing unit of claim 8 wherein said energy storage device includes a capacitor.

10. The sensing unit of claim 8 wherein said power provided to said power conditioning circuit is selectively provided to said energy storage device in response to said voltage modulated signal.

11. The sensing unit of claim 10 wherein said power provided to said power conditioning circuit is selectively provided to said energy storage device in response to a voltage level of said voltage modulated signal.

12. The sensing unit of claim 11 wherein said power provided to said power conditioning circuit is selectively provided to said energy storage device in response to said voltage level of said voltage modulated signal to a switch circuit.

13. The sensing unit of claim 12 wherein said switch circuit includes a field effect transistor.

14. The sensing unit of claim 12 wherein a pull up resistor electrically interconnects said power provided to said power conditioning circuit and said voltage modulated signal from said processor.

15. The sensing unit of claim 14 wherein said switch circuit electrically disconnects said energy storage device from said power provided to said power conditioning circuit when said voltage modulated signal is not present.

16. The sensing unit of claim 12 further comprising a diode electrically that electrically interconnects said power provided to said power conditioning circuit and said switch circuit.

17. The sensing until of claim 12 further comprising a current setting resistor that electrically interconnects said switch circuit and said energy storage device.

18. The sensing unit of claim 17 further comprising said processor sensing a voltage level of said energy storage device and in response selectively modulating said voltage modulated signal.

19. The sensing unit of claim 18 further comprising another switch which selectively interconnects said energy storage device and said wireless communication circuit.

20. The sensing unit of claim 19 wherein said another switch is selectively electrically disconnects said energy storage device and said wireless communication circuit during an initialization phase of said sensing unit.

21. A sensing unit to sense an environmental parameter comprising:
   (a) said sensing unit including an environmental sensor to sense said environmental parameter;
   (b) a processor enclosed that receives a sensor signal from said environmental sensor related to said environmental parameter;
   (c) a wireless communication circuit that receives data from said processor for being transmitted wirelessly related to said environmental parameter;
   (d) said wireless communication circuit configured to wirelessly transmit said received data from said processor;
   (e) said wireless communication circuit transmitting data, including said wireless communication circuit wirelessly transmitting said received data, based upon only at least one of (1) energy stored in a capacitive element and (2) power received from a 4-20 ma input signal to said sensing unit from a remote controller, in a manner that doesn't inhibit the capability of a non-wireless communication circuit to provide a 4-20 ma output signal.

22. The sensing unit of claim 21 wherein said processor and said wireless communication circuit only receive power from a 4-20 ma input signal to said sensing unit from a remote controller.

23. A sensing unit to sense an environmental parameter comprising:
   (a) said sensing unit including an environmental sensor to sense said environmental parameter;

(b) said sensing unit including an enclosure;
(c) a processor enclosed within said enclosure that receives a sensor signal from said environmental sensor related to said environmental parameter;
(d) a wireless communication circuit enclosed within said enclosure that receives data from said processor for being transmitted wirelessly related to said environmental parameter;
(e) said wireless communication circuit configured to wirelessly transmit said received data from said processor;
(f) said processor and said wireless communication circuit including an initial mode to charge a charge storage device in a manner faster than temporally after said initial mode is completed;
(g) said wireless communication circuit said transmitting data, including said wireless communication circuit wirelessly transmitting said received data, based only upon power received from a 4-20 ma input signal to said sensing unit from a remote controller.

24. The sensing unit of claim 23 wherein said processor and said wireless communication circuit only receive power from a 4-20 ma input signal to said sensing unit from a remote controller.

\* \* \* \* \*